(No Model.)
T. R. CRAMPTON.
RAILWAY WHEEL.
No. 370,451. Patented Sept. 27, 1887.
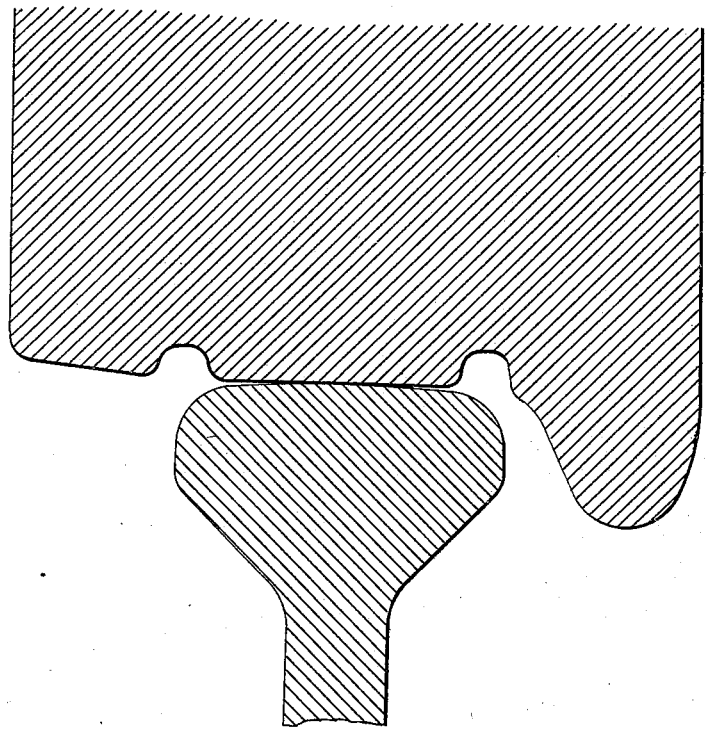
Witnesses.
Lloyd B. Wight,
S. Herbert Giesy.
Inventor:
T. R. Crampton
By Attys
Baldwin, Hopkins & Peyton

UNITED STATES PATENT OFFICE.

THOMAS RUSSELL CRAMPTON, OF WESTMINSTER, ENGLAND.

RAILWAY-WHEEL.

SPECIFICATION forming part of Letters Patent No. 370,451, dated September 27, 1887.

Application filed June 7, 1887. Serial No. 240,542. (No model.)

*To all whom it may concern:*

Be it known that I, THOMAS RUSSELL CRAMPTON, a subject of the Queen of Great Britain, residing at No. 4 Victoria Street, in the city of Westminster, England, civil engineer, have invented certain new and useful Improvements in Railway-Wheels, or Wheels for Vehicles Running Upon Rails, of which the following is a specification.

It is found that the tires of railway-wheels having regular or plane-surfaced treads are soon worn hollow on the tread which comes into contact with the rail, and when the tires are so worn the vehicle does not run as smoothly as before, the double incline produced on the tire by the wear tending to cause oscillation from side to side. Now, according to my invention I lessen the inequality of wear, as well as the tendency to oscillation, by grooving the periphery on either side of the tread of the wheel. I form these grooves at such a distance apart as to limit the bearing-surface or tread of the wheel to the part between the grooves, and so that the inner edges of the grooves pass frequently onto and from the wearing-surface or tread of the rail as the wheel plays to and fro across the rail a distance due to the clearance between the flanges and the rails. This arrangement results in the immediate correction of any tendency of the edges of the tread of the wheel to be left high, for the edge of the tread, if high, is immediately on passing onto the tread of the rail exposed to undue pressure, and disproportionate wear occurs until correction is effected.

I prefer that the wheel should be cylindrical in the tread; but my invention is applicable when the tread of the wheel is conical, as is at present usual. In other words, the wheel must be so formed as to have a regular or plane-surfaced tread—that is, so that any portion of the tread, when touching the rail, shall present thereto a bearing-surface in either a horizontal or inclined plane.

Although I prefer to groove the face of the wheel on both sides, the groove on the outer side, or that away from the flange, is less important than that on the flange side, and it may be omitted, especially if the tire be beveled off on this side, as is sometimes practiced.

The drawing shows a section of a wheel constructed in accordance with my invention.

Having now particularly described and ascertained the nature of my said invention and in what manner the same is to be performed, I declare that what I claim is—

1. A railway-wheel having the regular or plane-surfaced tread bounded on the side next the flange by an annular groove, substantially as and for the purpose set forth.

2. A railway-wheel having the regular or plane-surfaced tread bounded by the two annular grooves, substantially as and for the purpose set forth.

3. A railway-wheel having the regular or plane-surfaced tread bounded on one or both sides by a groove or grooves, and so constructed that its bounding-edges traverse laterally upon the face of the rail and are subject to wear together with the rest of the tread of the wheel, whereby the tread is prevented from wearing hollow or irregular, substantially as set forth.

THOMAS RUSSELL CRAMPTON.

Witnesses:
   J. G. CRAMPTON,
   GEORGE CRAMPTON.